United States Patent [19]

Collins

[11] Patent Number: 4,637,157
[45] Date of Patent: Jan. 20, 1987

[54] MULTI PART BUTT AND REEL SEAT USED ON FISHING RODS

[76] Inventor: Stuart M. Collins, 526 NE. 190 St., North Miami Beach, Fla. 33179

[21] Appl. No.: 848,769

[22] Filed: Apr. 7, 1986

[51] Int. Cl.$^4$ ............................................. A01K 87/06
[52] U.S. Cl. ............................................. 43/22; 43/23
[58] Field of Search ........................... 43/22, 23, 18.1

[56] References Cited

U.S. PATENT DOCUMENTS

| | | | |
|---|---|---|---|
| 4,050,179 | 9/1977 | Johnson | 43/22 |
| 4,083,141 | 4/1978 | Shedd | 43/22 |
| 4,403,439 | 9/1983 | Wallace | 43/23 |
| 4,467,548 | 8/1984 | Tabor | 43/23 |

Primary Examiner—Gene P. Crosby
Attorney, Agent, or Firm—John C. Malloy

[57] ABSTRACT

A multi component butt of the type designed for use in combination with a fishing rod used for trolling from the back of boats generally some distance from shore. The butt includes an elongated shank portion comprising a major length of the subject butt and having a hollow interior portion of substantially straight line, linear configuration wherein the hollow interior portion has a substantially common inner diameter extending along a vast majority of its length. A gimble is press fitted into one end of the shank portion and a guide tube is press fitted into the opposite end so as to protrude outwardly therefrom to accomplish a bonded fixed engagement with reel seat tube on which a reel used in combination with a finishing rod is mounted. One or more additional bushings may be disposed, through press fitting, on the interior of the shank portion for further retention and stability of the end of the rod passing into the interior of the shank portion through the guide tube.

9 Claims, 10 Drawing Figures

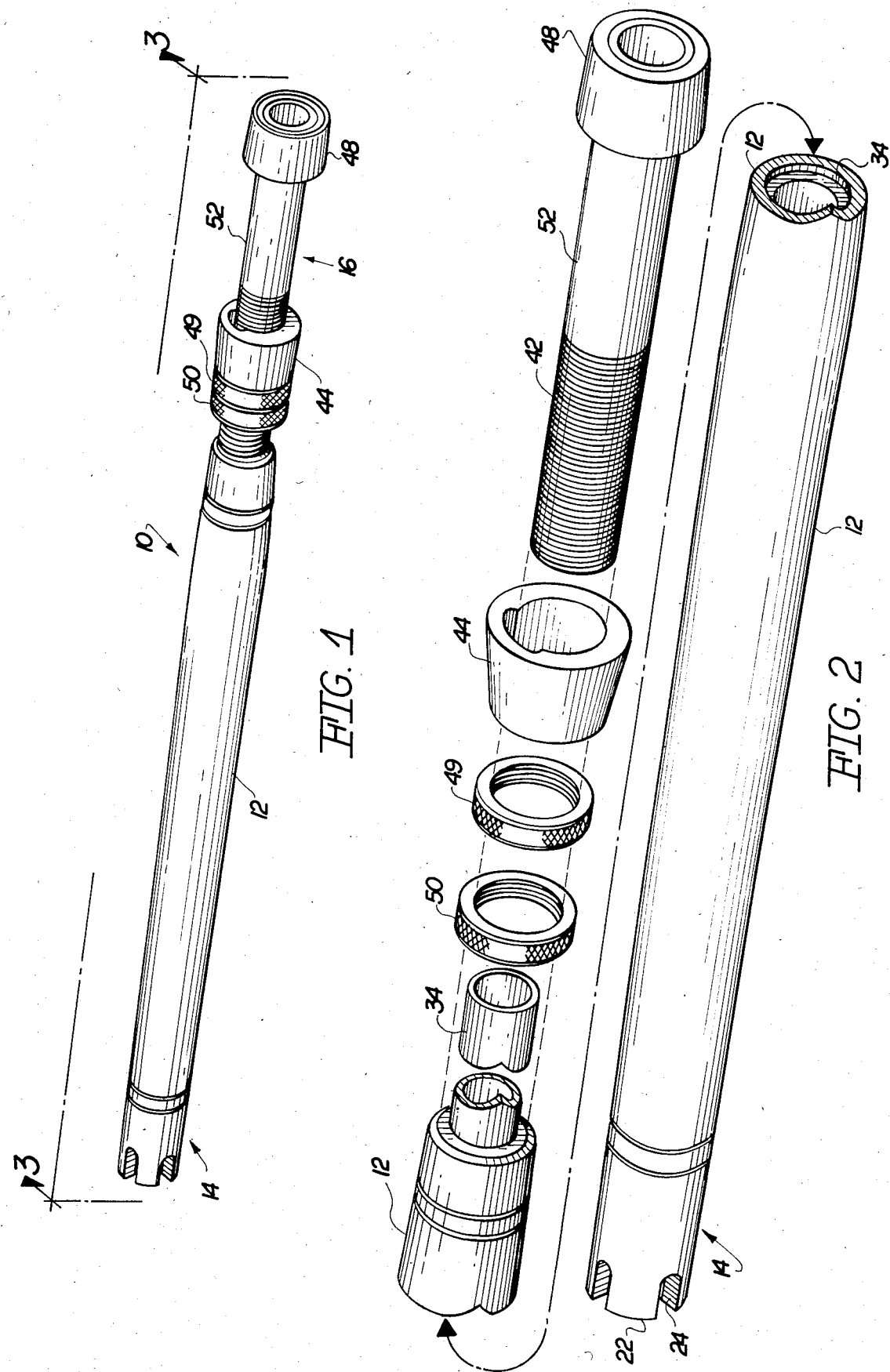

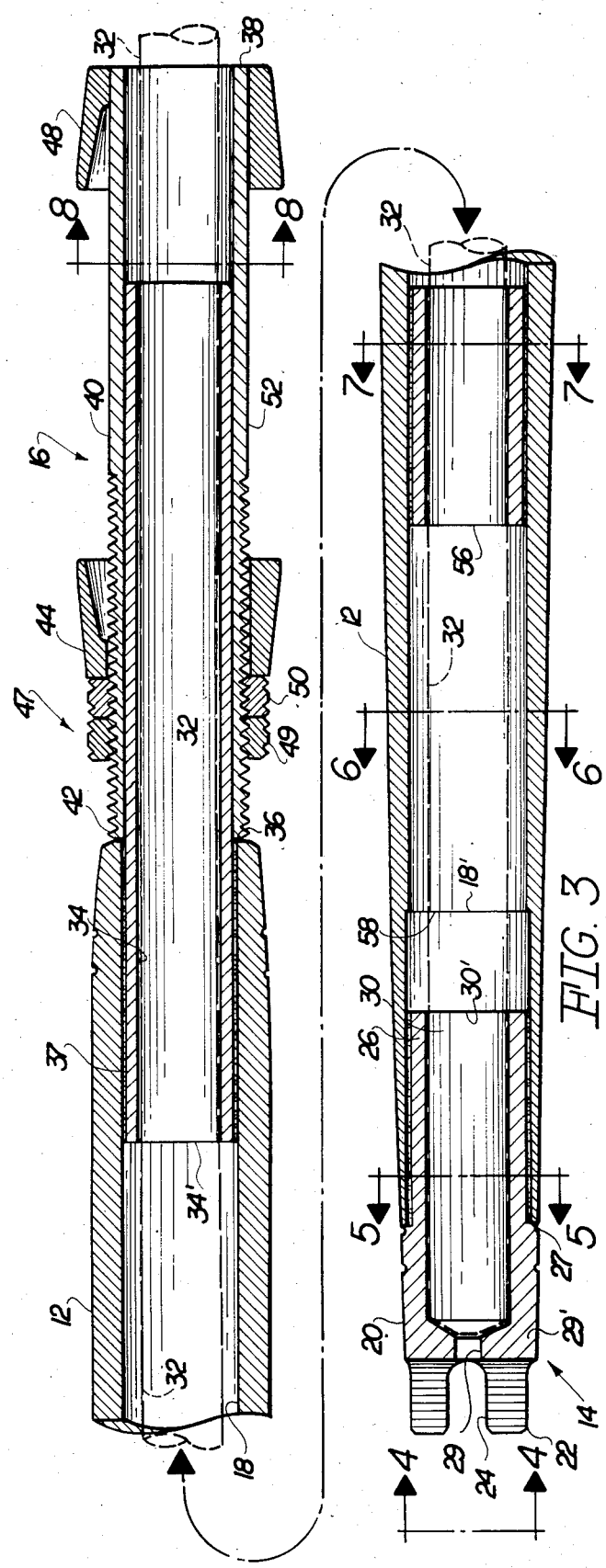
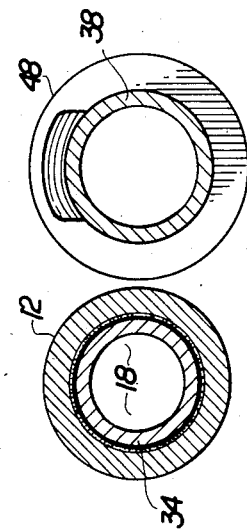
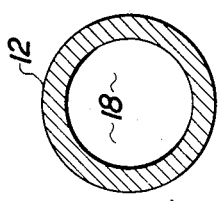
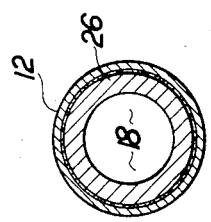

MULTI PART BUTT AND REEL SEAT USED ON FISHING RODS

BACKGROUND OF THE INVENTION

1. Field of the Invention

This invention relates to a butt of the type to be fitted in a contained socket of a "fighting chair" or on a "fighting belt" secured to the fisherman and used to support a trolling type fishing rod and including a reel seat mounted thereon for use in combination wih the trolling rod. The construction of the subject butt is of a multi component design as versus an integral construction so as to enhance the structural integrity of the butt by eliminating potential weak points especially in the elongated shank portion thereof.

2. Description of the Prior Art

Fishing rods primrily designed for use in deep sea trolling or surf fishing conventionally include an elongated rod blank defining the distal end of the rod. This rod end or blank is intended to be fitted within what is commonly referred to as a butt. The distal end of the butt is specifically configured to be received within a socket permanently but movably mounted on a "fighting chair" or even on a "fighting belt" secured to a fisherman. In addition, a reel used in combination with the fishing rod blank may be secured directly to the butt rather than the fishing rod itself.

It is obvious from the enormous amount of stress and "bending forces" placed on the butt that its construction and design must be adequate to withstand the aforementioned forces and also maintain a certain amount of structural integrity throughout its life.

The U.S. Patent to Shedd et al, No. 4,083,141 attempts to overcome the above set forth well recognized problems with these types of structures by designing an integral butt and reel seat for an offshore trolling rod made by swaging a unitary tubular member to form a rearwardly tapering butt section, a transition section tapering forwardly from a forward end of the butt section to a decreased diameter and a cylindrical reel seat section that extends forwardly from the transition section and has a forward end thereof threaded for reception of an adjustable threaded reel hood. Shedd et al recognizes that large bending forces are applied to the rod assembly, being applied to the butt by great leverage of the rod itself. Due to this great amount of stress, offshore trolling rods are most likely to break, under long use and great bending stresses, at the junction of the reel seat and the butt section. Specifically, in prior constructions that point of the butt section at which a shoulder is formed by the junction of the butt tenon and body portion of the butt provides a decreased diameter and a relatively sharp step or shoulder to concentrate stresses at the portion of decreased diameter, thus creating a greater probability of breakage at this point.

Again, Shedd et al attempts to overcome the above set forth problems by providing a unitary, one piece tubular "blank" which is swaged into a specific configuration. However, it should be noted that in the Shedd et al patent the unitary tubular blank from which the butt is formed, after the swaging operation has been completed, does not present a substantially unitary, straight line internal diameter longitudinally extending hollow portion of common internal diameter but rather, a "stepped" configuration having transition portions which could possibly result in points of stress at which the wall thickness of the resulting machined butt is reduced. Accordingly, after some generally extended usage, breakage could very well occur.

In order to overcome the problems recognized above, there is still a need in the sport fishing industry for a butt construction which is capable of maintaining a sufficient amount of structural integrity even after extended usage by providing the major length of the butt to include a straight line, linear configuration along an extended hollow interior of the butt and preferably to further include a substantially common inner diameter along the length thereof thereby removing any "transition portions" or shoulders at which forces may be concentrated during use of the butt which could result in potential points of weakness after the aformentioned extended usage.

Other U.S. Patents relating to the subject matter include Wallace, No. 4,403,439 directed to an integral fishing rod, handle and reel seat assembly molded of nylon on the distal end of an extruded fiberglass fishing rod.

SUMMARY OF THE INVENTION

The present invention is directed towards a butt designed to include a multi component construction wherein the components, for the most part, are fixedly secured to one another to provide a unitary butt construction of superior structural integrity. The subject butt assembly is designed to be used in combination with a fishing rod, more particularly, to receive a distal free end thereof which may be referred to as a rod blank.

The subject multi component butt assembly includes an elongated shank portion comprising a major length of the assembled butt wherein the shank portion includes oppositely disposed open ends and a hollow interior portion extending along the length of the shank portion. The hollow interior portion further, has a substantially common inner diameter extending from one end towards an opposite end to a point substantially adjacent to a gimble portion of the butt. The gimble portion includes transversely disposed slots for engagement of a retention pin, as is conventional, at the outer end thereof. Further, the gimble includes an elongated leading end specifically dimensioned and configured to extend into the adjacently positioned open end of the shank portion and be press fitted into fixed engagement with the interior surface of the hollow interior portion surrounding this end of the shank portion.

Similarly, at the opposite end of the shank portions a guide tube of straight line elongated configuration has one end press fitted therein. The guide tube is of sufficient length to extend outwardly from the associated end of the shank portion for mating engagement with a reel seat tube. The reel seat tube is telescoped over the protruding portion of the guide tube and affixed thereto as by bonding. The reel seat tube has a fixed hood and movable hood, the latter positioned relative to the former. Further, a locking assembly is provided to maintain the movable hood in a fixed position when the two hoods are engaging a reel in a somewhat conventional fashion.

An important feature of the present invention is the provision of a substantially straight line structural design, especially of the shank portion which absorbs the major part of the stress during use of the butt as when fighting a large fish. This straight line configuration, in combination with a substantially common inner diameter extending along the length of the shank portion allows a substantially consistant wall thickness of the shank portion. The above construction further in combination with press fitted connections with the gimble portion and the guide tube enables a sturdy, structurally reliant butt capable of long and extended use even under relatively harsh environmental conditions.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be hade to the following detailed description taken in connection with the accompanying drawings in which:

FIG. 1 is a perspective view of the assembled multi component butt assembly.

FIG. 2 is a perspective view in exploded form of the components associated with one end of the butt assembly relating to a reel seat.

FIG. 3 is a sectional view in exploded form showing the components of the subject butt assembly in their interconnected relation to one another as well as the interior structural details of the subject butt assembly.

FIG. 4 is an end view along line 4—4 of FIG. 3.

FIG. 5 is a sectional view along line 5—5 of FIG. 3.

FIG. 6 is a sectional view along line 6—6 of FIG. 3.

FIG. 7 is a sectional view along line 7—7 of FIG. 3.

FIG. 8 is a sectional view along line 8—8 of FIG. 3.

Like reference numerals refer to like parts throughout the several views of the drawings.

DETAILED DESCRIPTION OF THE PREFERRED EMBODIMENT

Figure 9:
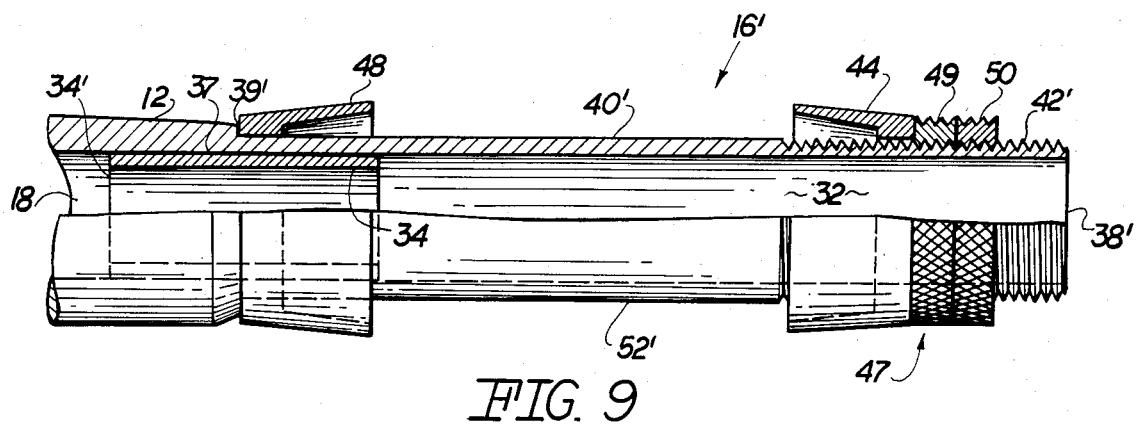
FIG. 9 is a sectional view in partial cutaway showing another embodiment of the subject invention.

A shown in FIG. 1, the present invention is directed towards a multi component butt assembly generally indicated as 10 and including a shank portion 12 having an elongated configuration and comprising the major length of the butt assembly 10. A gimble portion generally indicated as 14 is secured to a distal end of the shank portion 12. Similarly, a reel seat assembly generally indicated as 16 is secured to the opposite end of the shank portion and is provided for removable attachment of a reel thereto.

With primary reference to FIGS. 2 and 3, the shank portion 12 has a hollow interior 18 extending along its length and, the hollow interior portion 18 has a substantially straight line, linear configuration further defined by an inner diameter of the hollow interior portion 18 being substantially consistent throughout its length up to a point adjacent the securement of the gimble portion 14 as at 18'.

The gimble portion 14 includes a gimble knock 20 and a plurality of outwardly extending fingers 22 at least partially defined by transversely oriented slots 24 for engagement with a retention pin found in a receiving socket of a fighting chair or the like. The leading end of the gimble portion 14 includes an elongated finger 26 passing through a hole 27 formed in the associated end of the shank portion 12. Engagement between the inner surfaces of the end of the shank portion 12 and the outer surfaces of the finger 26 is permanent and accomplished by a press fitted engagement with one another so as to fixedly secure the gimble portion 14 in the position shown in FIGS. 1, 2 and 3. For purposes of drainage, an aperture 29 may be provided in communicating relation with an open ended channel 30. The channel extends from the open end of the finger as at 30' to a base of the gimble portion 14 29' wherein the extremity of a fishing rod or rod blank may be seated. The rod blank 32 is indicated in phantom lines as it extends throughout the interior of the butt assembly 10.

The opposite end of the shank portion 12 includes the provision of a guide tube 34 having one end 34' extending into the oppositely disposed end of the shank portion 12 relative to gimble portion 14 and through an open end 36 of the shank portion. Similar to the gimble portion 14, the guide tube 34 is press fitted as at 37 to the interior surface of the shank portion 12 adjacent the open end 36. However, the guide tube 34 is of sufficient length to protrude outwardly from the open end or opening 36 a sufficient distance to support and retain a reel seat tube 38 thereon. Further with regard to the guide tube 34, its inner diameter of its elongated hollow interior is sufficient to slidingly receive the length of the rod blank 32 and serve to retain and at least partially stabilize the rod blank when placed within the butt assembly 10.

Further with regard to the reel assembly 16, the reel seat tube 40 is telescopically positioned in surrounding relation to the protruding end of the guide tube 34 as shown clearly in FIGS. 2 and 3 and is fixedly secured thereto by a bonding composition as at 40. At least a portion of the exterior surface of the reel seat tube 38 is externally threaded as at 42 and a movable or adjustable hood 44 is movable along the length of the threaded surface 42. The movable or adjustable hood 44 is positionable accordingly relative to the fixed hood 48 fixedly disposed on one end of the reel seat tube 38. In conventional fashion, a reel (not shown) is mounted therebetween. A locking means generally indicated as 47 includes two locking nuts 49 and 50 each being internally threaded wherein locking nut 50 is disposed in abutting engagement with a corresponding positioned end of the adjustable hood 44 and the locking nut 49 is in turn disposed in abutting engagment with the locking nut 50 for the fixing of the positioned movable hood 44 relative to the fixed hood 48 when there is a reel mounted on the actual reel seat as at 52.

Figure 10:
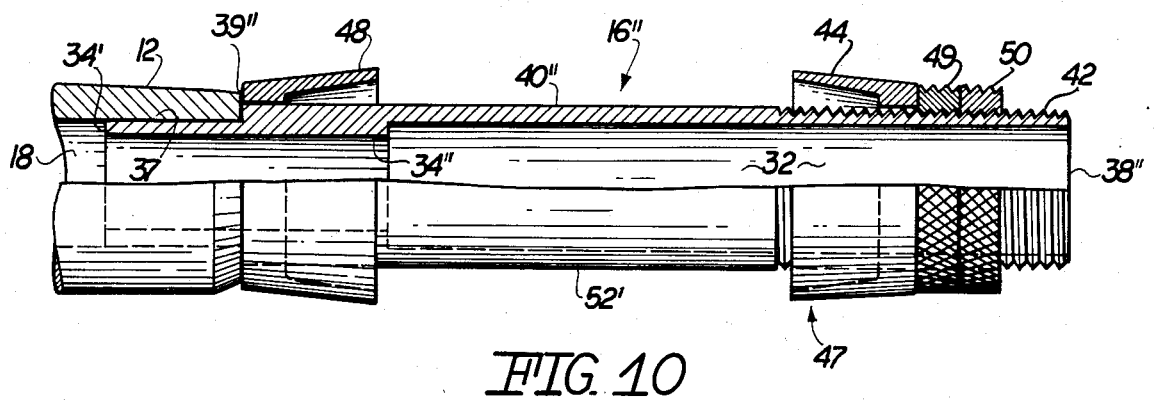
FIG. 10 is a sectional view in partial cutaway showing yet another embodiment of the present invention.

Other embodiments of the present invention directly specifically to the reel seat 16' and 16" are disclosed in FIGS. 9 and 10. More specifically, in the embodiment of FIG. 9, the shank portion 12 is integrally secured by means of a machine or shaped one piece construction to reel seat tube 40' and in surrounding relation to the guide tube 34. The guide tube 34 is press-fitted into the interior 32 of the assembly and is specifically located at the integral junction 39' between the primary shaft 12 and the reel sheat tube 40'. Accordingly, the actual reel seat on which the reel (not shown) is placed is indicated as 52.

Similarly, the embodiment of FIG. 10 differs from the embodiments of FIGS. 3 and 9 by the integral formation of the guide tube 34" on to a correspondingly positioned end of reel seat tube 40" and further, having a reduced diameter so as to be press-fitted into the corresponding open end of the shaft portion 12. Accordingly, the guide tube 34" is in fact an integral part of the reel seat tube 40" by virtue of a single one piece construction as clearly shown in FIG. 10.

Both the embodiments of FIG. 9 are generally similar to that in FIG. 3 including the guide tube 40' and 40" having a threaded exterior configuration for mating engagement with locking means 47 including locking nuts 49 and 50 which are disposed in abutting engagement with the hood 44. The hood 44 is movable over the outer surface of the reel seat tube 40" so as to come into contact with the base of the reel (not shown) which also cooperates at its opposite end with the fixed hood 48. The rod blank or end of the rod 32 (not shown in FIGS. 9 and 10) fits along the length of the bore 32 and enters the respective structures disclosed in the embodiments of FIGS. 9 and 10 through open distal end 38' and 38" respectively.

Other structural features of the present invention comprise the provision of a guide bushing 56 disposed on the interior 18 of the shank portion 12 and permanently affixed in such position by a press fitting engagement. The interior diameter of the open through bushing 56 is again substantially equivalent to that of the guide tube 34 thereby allowing a sliding engagement of the rod blank 32 and a retaining, stabilizing function to be performed thereon.

In yet another embodiment of the present invention, a gimble bushing 58 may be added to provide additional stabilizing portions and prevent "rattling" of the endmost portion of the rod blank 32 on the interior of the shank portion 12 especially if and when the gimble portion 14 is plugged and does not have the open channel 30 as shown in FIG. 3.

It is therefore to be understood that the following claims are intended to cover all of the generic and specific features of the invention herein described, and all statements of the scope of the invention which as a matter of language, might be said to fall therebetween.

Now that the invention has been described, what is claimed is:

1. A multi part butt assembly of the type designed for use on a trolling type fishing rod, said assembly comprising:
   (a) a shank portion formed of rigid, high strength material and having an elongated configuration and a substantially hollow interior portion extending along the length of said shank portion,
   (b) a first hole formed in one end of said shank and a second hole formed in an opposite end of said shank, said first and said second holes disposed in coaxial relation to one another,
   (c) a gimble portion including an elongated finger defining a leading end thereof, said finger including an open channel for seating the fishing rod and an outside diameter of lesser dimension than a trailing end of said gimble portion,
   (d) said gimble portion fixedly secured to said shank portion by passing said finger portion through said first hole and into a press fitted engagement with an interior surface of said shank portion adjacent said first hole,
   (e) a guide tube having an elongated configuration including one end press fitted into fixed engagement with an interior surface of said shank portion adjacent said second hole and extending outwardly therefrom through said second hole in coaxial disposition to said shank portion,
   (f) a reel seat tube telescopically disposed and supported on an outwardly protruding end of said guide tube and including an exteriorly threaded surface along at least a portion of the length thereof,
   (g) a fixed hood secured adjacent one end of said reel seat tube and a movable hood being movably mounted on said exterior threaded surface for selective movement towards and away from said fixed hood,
   (h) said reel seat tube further including locking means mounted thereon adjacent said movable hood for locking position thereof relative to said fixed hood,
   (i) said guide tube having an internal diameter along its length sufficient to slidingly receive a rod blank in close contact therein,
   (j) said hollow interior portion having a straight line configuration and a substantially common inner diameter along its length from said opposite end adjacent said second hole to a point substantially adjacent said gimble portion.

2. An assembly as in claim 1 further comprising a guide bushing fixedly secured on the interior of said shank portion along the length of said hollow interior portion and in spaced relation to said guide tube, said guide bushing having a hollow interior sized to receive the rod blank therein, whereby the rod blank is retained within said shank portion by both said guide tube and said guide bushing.

3. An assembly as in claim 2 further comprising a gimble bushing mounted within said shank portion along the length of said hollow interior portion and in spaced relation to said guide tube and adjacent said gimble portion.

4. An assembly as in claim 1 wherein said gimble portion with said open channel formed therein extends from an innermost end of said finger to a base of an outermost closed end of said gimble portion, said channel sized to receive an end portion of the rod blank therein.

5. An assembly as in claim 1 further comprising a gimble bushing mounted within said shank portion along the length of said hollow interior portion in spaced relation to said guide tube and adjacent said gimble portion.

6. An assembly as in claim 1 wherein said locking means comprises two cooperatively positioned and interacting locking nuts each being internally threaded and movably mounted to travel along the length of said externally threaded surface, one of said locking nuts being disposable into abutting engagement with said movable hood and another of said locking nuts disposable into abutting engagement with said one locking nut for locking the position of said movable hood when engaging a reel on said reel seat tube.

7. An assembly as in claim 1 wherein said reel seat tube comprises an inner surface dimensioned for sliding and surrounding engagement with an outer surface of a projecting portion of said guide tube, a bonding composition disposed in bonding engagement between said inner and outer surfaces so that said reel seat tube is fixedly secured in surrounding relation to said guide tube.

8. An assembly as in claim 1 wherein said reel seat tube is integrally secured by means of a one piece construction to said shank portion, said guide tube press-fitted into the interior of said shank portion and extending outwardly therefrom so as to extend into the interior of said guide tube, said guide tube disposed immediately adjacent an integral junction between said shank portion and said guide tube.

9. An assembly as in claim 1 wherein said guide tube is integrally secured to said reel seat tube and extends outwardly therefrom into the interior of said shank portion, said guide tube press-fitted into the interior of said guide portion substantially adjacent a junction between said shank portion and said reel seat tube.

* * * * *